Patented Nov. 22, 1927.

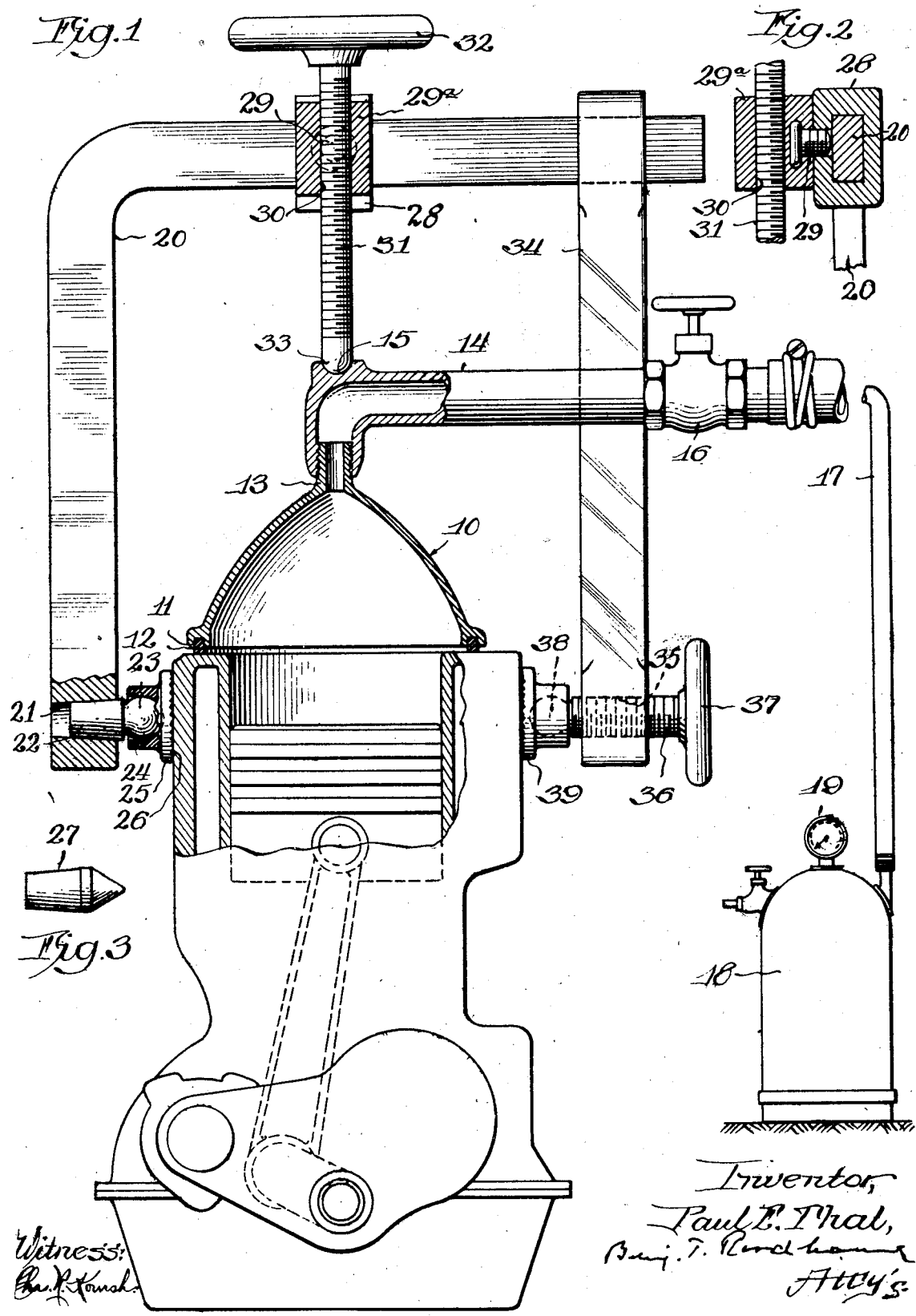

1,649,994

UNITED STATES PATENT OFFICE.

PAUL E. THAL, OF CHICAGO, ILLINOIS.

CYLINDER AND VALVE TESTING DEVICE.

Application filed December 29, 1924. Serial No. 758,628.

My present invention relates to cylinder and valve testing devices for use with internal combustion engines.

When the cylinder head is, or if the cylinders are cast en bloc, when the combined cylinder head is removed, the condition resulting from a leak of compression is the same whether the leak of compression occurred through leaking piston rings or improperly seating valves. It takes a more than usually experienced mechanician to diagnose dependably whether the valves or the piston rings are at fault. The present practice is, when a leak of compression is apprehended, to grind all of the valves and, if that does not bring the compression up to a satisfactory point, then to insert new and sometimes oversized piston rings. These operations are time consuming and expensive, and are often partially unnecessary so far as the mechanical condition of the engine is concerned. If it were ascertained before commencing the work just where the leak or leaks occurred, the work necessary for putting the engine or motor in good condition could be directed to the part needing attention, and in that way much time and money could be saved.

I have for my object the production of a cylinder and valve testing device which will permit the testing of each cylinder and valve independently so that it can be definitely determined which cylinders or valves may be out of order, and, generally, the test will also include a disclosure of the amount of leakage which has occurred through the particular cylinder or valve.

My device is pneumatically operated and may be caused to function either by an exhaustion of the air or by producing a pressure in the cylinder or in the valve pocket, the leakage of which vacuum or pressure will indicate the presence of an imperfection in the working of the particular part under test. The outside of cylinders or cylinder blocks are irregular in outline, and, therefore, as a part of my device, I have provided a clamping mechanism suitable for application to irregular objects which clamping mechanism will hold the pneumatic cup, either vacuum or pressure as the case may be, in proper position while the vacuum or pressure is produced.

I attain the aforementioned objects by means of the structure shown in the present drawing in which:—

Fig. 1 is a schematic view of my invention shown as applied to a cylinder of an internal combustion engine.

Fig. 2 is a fragmental section of the clamp saddle; and

Fig. 3 is an elevation of a pointed stub or center for the clamp.

My device comprises a vacuum cup 10 of either conical or semi-spherical conformation. Around the base of the cup 10 is provided an annular groove 11 for the receipt of a sealing gasket 12 of rubber or any other suitable material. At the apex of the cone or the center of the hemisphere is provided a nipple 13 which may be either threaded, as shown, or provided with a suitable ground joint. Secured to this nipple is an L shaped tube or fitting 14, near the juncture of the arms of which is provided a semi-spherical recess 15, for the purpose hereafter to be described. To the L shaped tube is secured a suitable valve 16 and from the valve 16 runs a flexible tube 17 to a tank 18 which may be exhausted or provided with a pressure as may be desired. Interposed in the tube 17 or attached to the tank is a pressure gauge 19.

The circumference of the cup 10 will, of course, limit its use to cylinders having a less diameter than the base of the cup and a sufficient diameter of block to receive the sealing gasket, but, in practice, a few different sizes of cups will be all that is necessary to test the divers sizes of valves and cylinders which are at present in commercial use.

To hold the cup in proper relation to the cylinders or valves, I provide a clamping device, comprising the L shaped member 20 adjacent the outer end of one arm of which is provided conical aperture 21 to receive the conical end of a stub 22 on the outer end of which is a ball 23 which sets in a semi-spherical recess 24 or pocket of a clamping foot 25, the front surface of which foot may be ribbed as at 26. Where the space for its insertion is limited the stub 22, may be replaced with a pointed stub 27, as shown in Fig. 3. Sliding on the other end of the L shaped member 20 is a saddle or block 28, from the side of which extends a stub 29 having a pivotal mounting in the block 29ª. The block 29ª is transversely bored and internally threaded at 30, to take the screw 31 which is provided at its outer end with a hand wheel 32, and upon its opposite end with a ball end 33, which co-acts with the spherical recess 15 in the base of the L shaped member 14 heretofore mentioned. Also sliding upon the same arm of the L shaped member 20 upon which the block 28 is mounted is an arm 34, which extends parallel with the other arm of the L shaped member 20. At the extended end of the arm member 34, is provided a transverse internally threaded bore 35 for the receipt of a screw 36 upon the outer end of which is mounted a hand wheel 37, and upon the inner end of which is a ball 38 co-operating with a foot 39 in all respects similar to the foot 25. The clamp may be quickly adjusted in approximately the right position by sliding the arm 34 into such a position as to bring the feet 25 and 39 upon opposite sides of the cylinder or cylinder block, and then by turning the screw 36, the arm 34 is caused to bind with the portion of the L shaped member upon which it slides, and the clamp is securely attached to the cylinder or block. The cup 10 is then placed over the desired cylinder opening or valve opening and the screw 31 screwed down until the cup is sufficiently secured to the cylinder or block. The air is then turned on, or the vacuum is released, as the case may be, and the pressure gauge will then indicate definitely by the movement of its hand if there is any leak in the part under investigation, and also roughly the amount of such leak. This operation independently tests each cylinder and valve and apprises the investigator definitely whether trouble is present in the part under investigation.

Having described my invention what I claim as new and desire to secure by Letters Patent is:—

1. A device for testing cylinders and valves of internal combustion engines comprising a pneumatic tank, a pneumatic gage co-actively related to said tank, a pneumatic cup, a conduit connecting said tank and cup, and a clamp for engaging a cylinder and having a swivel connection with said cup.

2. A device for testing cylinders and valves comprising a pneumatic cup, a sealing gasket disposed adjacent to said cup, a nipple in the center of said cup, a tubular L-shaped connection connected with said nipple, a clamp for engaging a cylinder and having a swivel connection with said tubular L-shaped connection, a pneumatic gage, a pneumatic tank, a conduit connecting said tank and tubular L-shaped connection, said gage being connected to said system so as to indicate a change of pressure therein.

3. In a testing device for cylinders and valves comprising a cup, a tank, and a pneumatic gage connected in series, a clamp for engaging a cylinder and holding said cup in position comprising an L-shaped member, an arm sliding on a leg of said L-shaped member, pivotal shoes carried by said slidable arm and the opposite leg of said L-shaped member, a saddle movable on a leg of said L-shaped member, a block pivotally carried by said saddle, and a screw co-acting with said block and said cup.

4. A device for testing cylinders and valves of internal combustion engines comprising a tank, a pneumatic cup, a flexible conduit connecting said tank and cup, a pneumatic gage connected with the foregoing system for showing a change of pressure therein, and a valve for controlling connection between said tank and cup.

5. A device for testing cylinders and valves of internal combustion engines comprising a pneumatic cup, a tubular L-shaped connection having a recess opposite one arm thereof, said arm being secured to said cup, a pneumatic tank, a conduit connecting said L-shaped connection and tank, a pressure gage for showing a change of pressure in said system, and a clamp of U-shaped form, one arm whereof is slidable with relation to the base of said U-shaped clamp, a saddle slidable with relation to the base of said U-shaped clamp, a block pivotally carried by said saddle, and a screw co-acting with said block and the recess in said tubular U-shaped connection.

PAUL E. THAL.